United States Patent
Nagai (10) Patent No.: US 10,016,893 B2
(45) Date of Patent: Jul. 10, 2018

(54) ROBOT HAND CONTROLLING METHOD AND ROBOTICS DEVICE

(71) Applicant: CANON KABUSHIKI KAISHA, Tokyo (JP)

(72) Inventor: Masayuki Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/002,394

(22) Filed: Jan. 20, 2016

(65) Prior Publication Data
US 2016/0221188 A1  Aug. 4, 2016

(30) Foreign Application Priority Data
Feb. 3, 2015  (JP) .................................. 2015-019482

(51) Int. Cl.
| | |
|---|---|
| *B25J 9/00* | (2006.01) |
| *B25J 9/16* | (2006.01) |
| *B25J 15/08* | (2006.01) |
| *B25J 15/02* | (2006.01) |

(52) U.S. Cl.
CPC .......... *B25J 9/1612* (2013.01); *B25J 15/026* (2013.01); *B25J 15/08* (2013.01); *G05B 2219/39505* (2013.01); *Y10S 901/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,302,138 A | * | 11/1981 | Zarudiansky | B25J 3/04 414/5 |
| 4,367,891 A | * | 1/1983 | Wauer | B25J 15/0009 269/266 |

(Continued)

FOREIGN PATENT DOCUMENTS

| | | |
|---|---|---|
| CN | 102772865 | 11/2012 |
| CN | 103507076 | 1/2014 |

(Continued)

OTHER PUBLICATIONS

European Search Report dated Jun. 3, 2016 in European Application No. 16153094.4-4-1870.

(Continued)

*Primary Examiner* — Jonathan L Sample
(74) *Attorney, Agent, or Firm* — Fitzpatrick, Cella, Harper & Scinto (57) ABSTRACT

A robot hand controlling method executes calculating a position and changing grip force when the grip force for gripping a work W is to be changed in a state that fingers are gripping the work W with first grip force. In the calculating the position, the hand controlling unit uses a correlation value indicating a relationship between the grip force of the fingers and position of fixing portions, the first grip force, and second grip force that is a target value of the grip force to calculate the position of the fixing portions in gripping the work W with the second grip force. In the changing the grip force, the hand controlling unit drives a motor by calculating a driving quantity of the motor necessary for moving the fingers to the calculated position of the fixing portions.

13 Claims, 8 Drawing Sheets

(56) References Cited

U.S. PATENT DOCUMENTS

| | | | | | |
|---|---|---|---|---|---|
| 4,715,773 A | * | 12/1987 | Parker | | B25J 13/082 318/568.21 |
| 4,730,862 A | * | 3/1988 | Caen | | B25J 13/082 294/207 |
| 4,783,107 A | * | 11/1988 | Parker | | B25J 13/082 294/213 |
| 4,921,293 A | * | 5/1990 | Ruoff | | A61F 2/583 294/106 |
| 4,957,320 A | * | 9/1990 | Ulrich | | B25J 9/102 192/56.1 |
| 4,980,626 A | * | 12/1990 | Hess | | B25J 9/1005 250/559.33 |
| 5,108,140 A | * | 4/1992 | Bartholet | | B25J 15/0009 294/106 |
| 5,172,951 A | * | 12/1992 | Jacobsen | | A61F 2/588 294/104 |
| 5,501,498 A | * | 3/1996 | Ulrich | | B25J 9/102 294/106 |
| 5,762,390 A | * | 6/1998 | Gosselin | | B25J 15/0009 294/106 |
| 5,967,580 A | * | 10/1999 | Rosheim | | B25J 3/04 294/106 |
| 6,517,132 B2 | * | 2/2003 | Matsuda | | B25J 15/0009 294/106 |
| 6,594,552 B1 | * | 7/2003 | Nowlin | | B25J 9/1689 700/260 |
| 6,817,641 B1 | * | 11/2004 | Singleton, Jr. | | B25J 9/102 294/106 |
| 7,168,748 B2 | * | 1/2007 | Townsend | | B25J 9/1612 294/106 |
| 7,183,757 B2 | * | 2/2007 | Nagai | | H02M 3/157 323/283 |
| 7,244,093 B2 | * | 7/2007 | Watanabe | | B25J 9/1697 198/395 |
| 7,289,884 B1 | * | 10/2007 | Takahashi | | B25J 9/1612 318/568.12 |
| 7,315,159 B2 | * | 1/2008 | Nagai | | H02M 3/157 323/283 |
| 7,340,100 B2 | * | 3/2008 | Higaki | | G06F 3/017 382/199 |
| 7,443,115 B2 | * | 10/2008 | Okamoto | | B25J 9/1612 318/100 |
| 7,549,688 B2 | * | 6/2009 | Hayakawa | | B25J 9/0009 294/106 |
| 7,564,209 B2 | * | 7/2009 | Mochizuki | | B25J 7/00 318/568.11 |
| 8,041,457 B2 | * | 10/2011 | Ohno | | B25J 9/1612 294/106 |
| 8,260,458 B2 | * | 9/2012 | Kim | | B25J 9/1612 294/213 |
| 8,280,837 B2 | * | 10/2012 | Platt | | B25J 9/1612 294/110.1 |
| 8,297,672 B2 | * | 10/2012 | Kim | | B25J 9/104 294/106 |
| 8,346,393 B2 | * | 1/2013 | Kim | | B25J 9/1612 700/261 |
| 8,364,314 B2 | * | 1/2013 | Abdallah | | H01R 13/17 700/264 |
| 8,463,434 B2 | * | 6/2013 | Takahashi | | B25J 9/1612 318/568.16 |
| 8,483,882 B2 | * | 7/2013 | Abdallah | | H01R 13/17 700/245 |
| 8,504,198 B2 | * | 8/2013 | Takahashi | | B25J 9/1612 700/245 |
| 8,909,374 B2 | * | 12/2014 | Fudaba | | B25J 13/02 700/253 |
| 8,979,152 B2 | * | 3/2015 | Ciocarlie | | B25J 15/08 294/106 |
| 9,321,176 B1 | * | 4/2016 | Sun | | B25J 9/1612 |
| 2004/0028260 A1 | * | 2/2004 | Higaki | | G06F 3/017 382/118 |
| 2004/0140787 A1 | * | 7/2004 | Okamoto | | B25J 9/1612 318/568.21 |
| 2005/0125099 A1 | * | 6/2005 | Mikami | | G06N 3/008 700/245 |
| 2006/0012198 A1 | * | 1/2006 | Hager | | B25J 9/1612 294/106 |
| 2006/0128316 A1 | * | 6/2006 | Moller | | G09B 23/32 455/67.15 |
| 2006/0145494 A1 | * | 7/2006 | Nihei | | B25J 9/1612 294/106 |
| 2006/0293615 A1 | * | 12/2006 | Valero-Cuevas | | A61B 5/1125 600/587 |
| 2007/0010913 A1 | * | 1/2007 | Miyamoto | | B25J 9/1658 700/264 |
| 2007/0018470 A1 | * | 1/2007 | Hayakawa | | B25J 9/0009 294/106 |
| 2007/0219668 A1 | * | 9/2007 | Takahashi | | B25J 9/1612 700/249 |
| 2007/0236162 A1 | * | 10/2007 | Kawabuchi | | B25J 9/102 318/568.16 |
| 2008/0027582 A1 | * | 1/2008 | Obinata | | B25J 13/082 700/260 |
| 2008/0077361 A1 | * | 3/2008 | Boyd | | B25J 9/1612 702/189 |
| 2008/0114491 A1 | * | 5/2008 | Takahashi | | B25J 9/1612 700/245 |
| 2009/0069942 A1 | * | 3/2009 | Takahashi | | B25J 9/1633 700/260 |
| 2009/0076657 A1 | * | 3/2009 | Tsuboi | | G05B 13/021 700/275 |
| 2009/0261609 A1 | * | 10/2009 | Shibamoto | | B25J 15/022 294/106 |
| 2009/0302626 A1 | * | 12/2009 | Dollar | | B25J 9/104 294/106 |
| 2009/0306825 A1 | * | 12/2009 | Li | | B25J 9/1669 700/261 |
| 2010/0011899 A1 | * | 1/2010 | Kim | | B25J 9/104 74/490.04 |
| 2010/0138039 A1 | * | 6/2010 | Moon | | B25J 9/1612 700/245 |
| 2010/0161130 A1 | * | 6/2010 | Kim | | B25J 9/1612 700/261 |
| 2010/0280661 A1 | * | 11/2010 | Abdallah | | H01R 13/17 700/260 |
| 2010/0280663 A1 | * | 11/2010 | Abdallah | | H01R 13/17 700/264 |
| 2011/0067521 A1 | * | 3/2011 | Linn | | B25J 15/0009 74/490.06 |
| 2011/0288683 A1 | * | 11/2011 | Kondo | | B25J 9/1612 700/260 |
| 2012/0175904 A1 | * | 7/2012 | Murakami | | B25J 15/10 294/213 |
| 2012/0253516 A1 | * | 10/2012 | Iida | | B25J 9/1669 700/258 |
| 2012/0283875 A1 | * | 11/2012 | Klumpp | | B25J 9/1648 700/258 |
| 2012/0290133 A1 | * | 11/2012 | Goto | | B25J 9/1612 700/258 |
| 2012/0296472 A1 | * | 11/2012 | Nagai | | B25J 9/1612 700/258 |
| 2013/0033053 A1 | * | 2/2013 | Wilkinson | | B25J 15/024 294/198 |
| 2013/0041502 A1 | * | 2/2013 | Shi | | B25J 9/1612 700/245 |
| 2013/0178978 A1 | * | 7/2013 | Kim | | G05D 3/00 700/251 |
| 2013/0184871 A1 | * | 7/2013 | Fudaba | | B25J 13/02 700/264 |
| 2014/0148951 A1 | * | 5/2014 | Saen | | B25J 13/083 700/259 |
| 2014/0163729 A1 | * | 6/2014 | Shi | | B25J 9/1612 700/245 |
| 2014/0232124 A1 | * | 8/2014 | Dan | | B25J 15/0009 294/198 |

(56) References Cited

U.S. PATENT DOCUMENTS

| | | | |
|---|---|---|---|
| 2015/0134114 A1* | 5/2015 | Tsusaka | B25J 13/04 700/257 |
| 2015/0224650 A1* | 8/2015 | Xu | B25J 15/0608 700/213 |
| 2016/0221188 A1* | 8/2016 | Nagai | B25J 9/1612 |

FOREIGN PATENT DOCUMENTS

| | | |
|---|---|---|
| CN | 103846923 | 6/2014 |
| CN | 204076288 | 1/2015 |
| JP | 2002-178281 A | 6/2002 |

OTHER PUBLICATIONS

Mark D. Hanes, et al., "Intelligent Control of Object Acquisition for Power Grasp", IEEE, 1994 pp. 303 to 308.
Kai-Tai Song, et al., "A Fuzzy Adaptive Control Design for Compliant Motion of a Manipulator", IEEE, 1994, pp. 703-707.
Chinese Office Action dated May 10, 2018 during prosecution of related Chinese application No. 201610063959.9. (Whole English-language translation included.).

* cited by examiner

| ADJUST GRIP FORCE ΔF [N] | Δd [mm]  ※ WITH F = 2 [N] AS REFERENCE | | | | | |
|---|---|---|---|---|---|---|
| | 1st TIME | 2nd TIME | 3rd TIME | | n-th TIME | AVERAGE |
| 0 | 0 | 0 | 0 | ... | 0 | 0 |
| 2 | 0.0932 | 0.0932 | 0.0972 | ... | 0.0952 | 0.0952 |
| 4 | 0.1808 | 0.1808 | 0.1808 | ... | 0.1788 | 0.1808 |
| 6 | 0.2578 | 0.2588 | 0.2548 | ... | 0.2568 | 0.2568 |
| 8 | 0.3232 | 0.3212 | 0.3232 | ... | 0.3212 | 0.3232 |
| 10 | 0.378 | 0.38 | 0.38 | ... | 0.38 | 0.38 |
| 12 | 0.4668 | 0.4648 | 0.4628 | ... | 0.4648 | 0.4648 |
| 14 | 0.4908 | 0.4948 | 0.4928 | ... | 0.4938 | 0.4928 |
| 16 | 0.5132 | 0.5112 | 0.5092 | ... | 0.5132 | 0.5112 |

ROBOT HAND CONTROLLING METHOD AND ROBOTICS DEVICE

BACKGROUND OF THE INVENTION

Field of the Invention

The present invention relates to a robot hand controlling method and a robotics device that control a robot hand.

Description of the Related Art

In recent years, a robotics device including a robot hand is used as an industrial robot to advance the automation of product assembly conventionally performed by manpower. When the robot hand is used to handle a work to assemble a variety of products, the work needs to be surely gripped without breaking or dropping the work, regardless of the physical properties of the work. In recent years, enabling to easily control the grip force of the robot hand is demanded to accurately grip the work in order to realize further advanced product assembly using the industrial robot.

A method of using a disturbance estimation observer to control the grip force of the robot hand (see Japanese Patent Application Laid-Open No. 2002-178281) is proposed as an example of a method of controlling the grip force. To cause a grip apparatus to grip the work in a grip force controlling apparatus disclosed in Japanese Patent Application Laid-Open No. 2002-178281, the driving current and the rotating speed of a motor that provides the grip force are input, and the disturbance estimation observer outputs an estimation value of the grip force of the robot hand. The grip force controlling apparatus disclosed in Japanese Patent Application Laid-Open No. 2002-178281 performs control of eliminating the deviation between the grip force estimation value output from the disturbance estimation observer and a grip force target value to thereby control the grip force of the robot hand.

However, in the invention described in Japanese Patent Application Laid-Open No. 2002-178281, frictional force generated in a driving mechanism that drives fingers is switched from static friction to kinetic friction and is significantly changed in a transition from a state in which the movement speed of the fingers of the robot hand is 0 to a state in which a motor begins to revolve. Therefore, a compensation coefficient of the disturbance estimation observer for estimating the influence of the friction cannot be uniquely identified. In the invention described in Japanese Patent Application Laid-Open No. 2002-178281, hysteresis, i.e. dead zone that cannot be controlled, is provided to the compensation coefficient of the disturbance estimation observer for estimating the influence of the friction when the movement speed of the fingers is 0 and when the movement speed of the fingers is not 0. Therefore, in the invention described in Japanese Patent Application Laid-Open No. 2002-178281, accurate adjustment and control of the grip force of the robot hand is difficult in the state that the robot hand is gripping the work.

A method of using an external force sensor that can measure the grip force and controlling the grip force while measuring the grip force of the robot hand can be considered. However, a member for causing the external force sensor to detect the grip force needs to be separately provided to the robot hand in this case, and downsizing of the robot hand is difficult. Furthermore, the force sensor is generally more expensive than a sensor capable of measuring a position, and reduction in the cost of the robot hand is also difficult. The measurement accuracy of the force sensor is lower than that of a position sensor or the like, and accurate adjustment and control of the grip force of the robot hand is difficult.

SUMMARY OF THE INVENTION

An object of the present invention is to provide a robot hand controlling method capable of accurately adjusting grip force and a robotics device capable of accurately adjusting grip force with a simple configuration.

According to an aspect of the present invention, provided is a controlling method of a robot hand, the robot hand comprising: a plurality of fingers capable of grasping a work; an actuator that generates driving force; and a driving force transmission mechanism that moves the plurality of fingers according to a driving quantity of the actuator, wherein, when grip force for gripping the work by the plurality of fingers is to be changed in a state that the plurality of fingers are gripping the work with first grip force, the controlling unit executes: calculating a position of the plurality of fingers in gripping the work with second grip force by the plurality of fingers by using a correlation value indicating a relationship between the grip force of the plurality of fingers and the position of the plurality of fingers, the first grip force, and the second grip force that is a target value of the grip force; and changing the grip force by driving the actuator after calculating the driving quantity of the actuator necessary for moving the plurality of fingers to the position of the plurality of fingers calculated in the calculating the position.

According to a further aspect of the present invention, a robotics device comprises: a robot hand comprising: a plurality of fingers capable of grasping a work; an actuator that generates driving force; and a driving force transmission mechanism that moves the plurality of fingers according to a driving quantity of the actuator; and a controlling unit that controls the robot hand, wherein, when grip force for gripping the work by the plurality of fingers is to be changed in a state that the plurality of fingers are gripping the work with first grip force, the controlling unit calculates a position of the plurality of fingers in gripping the work with second grip force by the plurality of fingers by using a correlation value indicating a relationship between the grip force of the plurality of fingers and the position of the plurality of fingers, the first grip force, and the second grip force that is a target value of the grip force and changes the grip force by driving the actuator after calculating the driving quantity of the actuator necessary for moving the plurality of fingers to the calculated position of the plurality of fingers.

According to the present invention, since the grip force can be changed by calculating the driving quantity of the actuator from the position of the plurality of fingers in gripping the work with the changed grip force, the grip force can be accurately adjusted.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
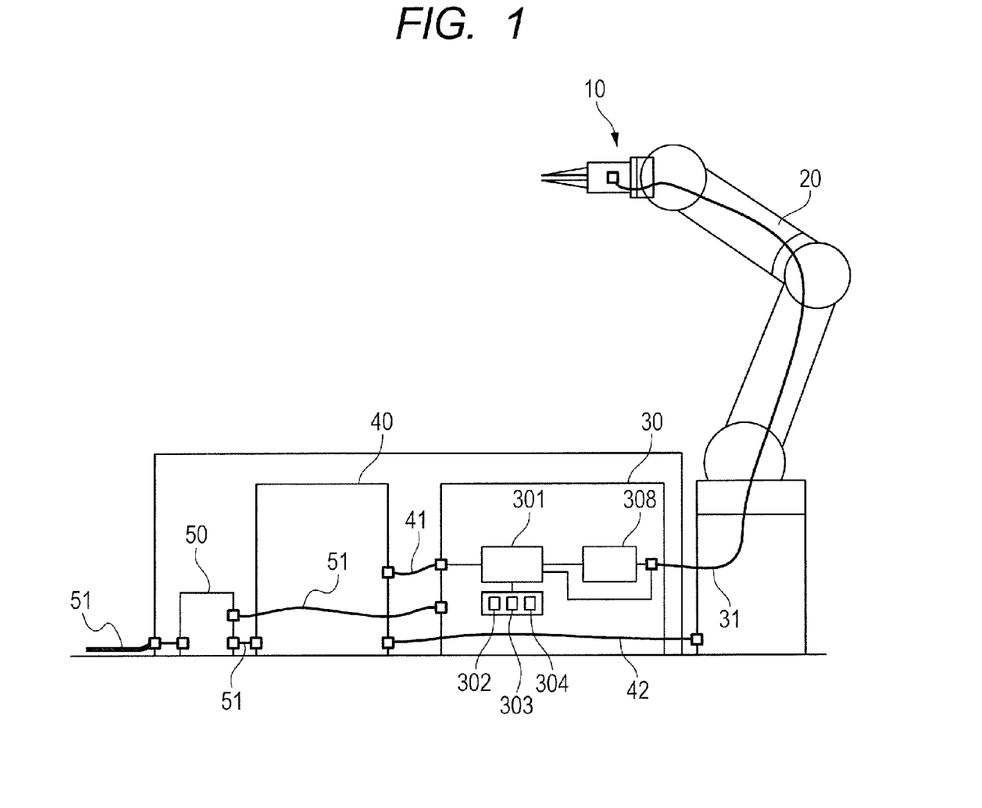
FIG. 1 is a schematic diagram illustrating a robotics device according to an embodiment of the present invention.

An embodiment of the present invention will now be described with reference to FIGS. 1 to 7. FIG. 1 is a schematic diagram illustrating a schematic configuration of a robotics device according to the embodiment of the present invention.

A robotics device 1 includes: a robot hand 10 capable of grasping a work W (see FIG. 2); and a robot arm 20 including the robot hand 10 at a tip, the robot arm 20 controlling the position of the robot hand 10 and including a plurality of joints. The robotics device 1 further includes: a hand controlling unit 30 as a controlling unit that controls the robot hand 10; and a controlling instruction unit 40 capable of transmitting various controlling instructions. The robotics device 1 further includes a power controlling unit 50 that supplies power to the elements included in the robotics device 1 through power supply cables 51.

The controlling instruction unit 40 is connected to the hand controlling unit 30 through a communication cable 41 and transmits a controlling instruction for opening and closing fingers 11a and 11b (see FIG. 2) of the robot hand 10 to the hand controlling unit 30 through the communication cable 41 to open and close the fingers 11a and 11b. Communication between the hand controlling unit 30 and the controlling instruction unit 40 is performed by, for example, parallel I/O or high-speed differential serial communication with high resistance to noise.

The controlling instruction unit 40 is connected to an arm controlling unit not illustrated included in the robot arm 20 through an arm cable 42 and transmits a controlling instruction for operating the joints to the arm controlling unit through the arm cable 42 to operate the robot arm 20. More specifically, the controlling instruction unit 40 can control the robot hand 10 and the robot arm 20 and serve as a robot system to grip and assemble components to realize product assembly. The details of control executed by the controlling instruction unit 40 and the controlling instructions transmitted to the hand controlling unit 30 by the controlling instruction unit 40 are designed in advance by the user in JOB programs of product assembly operation of the robot system and are stored in a memory of the controlling instruction unit 40. The robot arm 20 may include a plurality of arm controlling units that controls operation of each joint.

The power controlling unit 50 is connected to an external power supply provided outside of the robotics device 1 through the power supply cable 51 and adjusts the power supplied from the external power supply to supply necessary power to the hand controlling unit 30, the controlling instruction unit 40 and the like.

Figure 2:
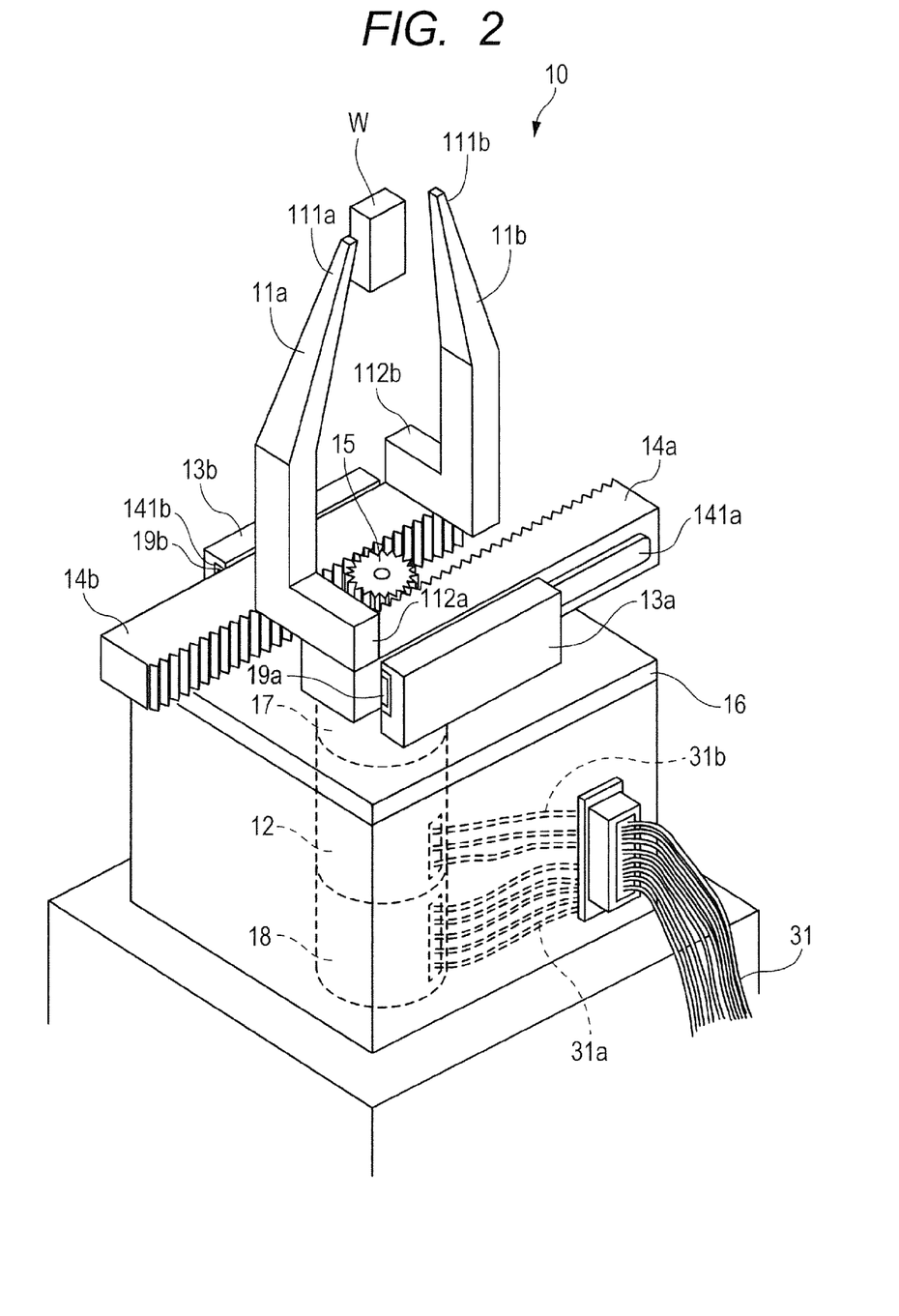
FIG. 2 is a perspective view illustrating a configuration of a robot hand according to the embodiment of the present invention.

FIG. 2 is a diagram illustrating a configuration of the robot hand 10. As illustrated in FIG. 2, the robot hand 10 includes: the pair of fingers 11a and 11b capable of grasping the work W; and a motor 12 as an actuator that generates driving force. The robot hand 10 further includes a pair of linear guides 13a and 13b, a pair of rack gears 14a and 14b and a pinion gear 15 that are driving force transmission mechanisms for moving the fingers 11a and 11b based on a movement quantity according to a driving quantity of the motor 12.

The fingers 11a and 11b have a tweezer shape and include: contact portions 111a and 111b that come into contact with the work W to grip the work W; and fixing portions 112a and 112b fixed to the rack gears 14a and 14b. The fingers 11a and 11b move in a direction for griping the work W and in a direction away from the work W according to the movement of the rack gears 14a and 14b.

The motor 12 is, for example, a three-phase AC servo motor and is attached to a lower surface of a base plate 16. The motor 12 includes: a decelerator 17 that amplifies output torque of the motor 12; and an encoder circuit 18 as a sensor that detects the number of rotations and the rotation angle of the motor 12. The motor 12 is connected to the hand controlling unit 30 through hand cables 31.

The hand cables 31 include: encoder signal lines 31a for transmitting output signals output from the encoder circuit 18 to the hand controlling unit 30; and motor power lines 31b for supplying driving current to the motor 12. The encoder signal lines 31a include five lines for power supply of the encoder circuit 18, GND, and an A phase, a B phase and a Z phase of the output signals of the encoder, for example. The motor power lines 31b are power lines corresponding to the type of the motor 12 and include three power lines connected to a U phase, a V phase and a W phase when the motor 12 is, for example, a three-phase AC servo motor.

The pair of linear guides 13a and 13b is attached to an upper surface of the base plate 16 and include guide grooves 19a and 19b on surfaces opposite to each other. The pair of rack gears 14a and 14b include guide protrusions 141a and 141b in a protrusion shape fitted to the guide grooves 19a and 19b of the linear guides 13a and 13b, on surfaces opposite to tooth surfaces of the gears. The guide protrusions 141a and 141b are fitted to the guide grooves 19a and 19b and attached to the linear guides 13a and 13b. In this way, the rack gears 14a and 14b can move the fingers 11a and 11b in parallel in the open and close directions for contacting and separating the fingers 11a and 11b.

The pinion gear 15 is attached to a driving shaft of the motor 12 and is engaged with gear tooth surfaces of the rack gears 14a and 14b. In this way, the robot hand 10 can drive the motor 12 to normally and reversely rotate the pinion gear 15 to move the rack gears 14a and 14b in parallel to open and close the fingers 11a and 11b.

Figure 3:
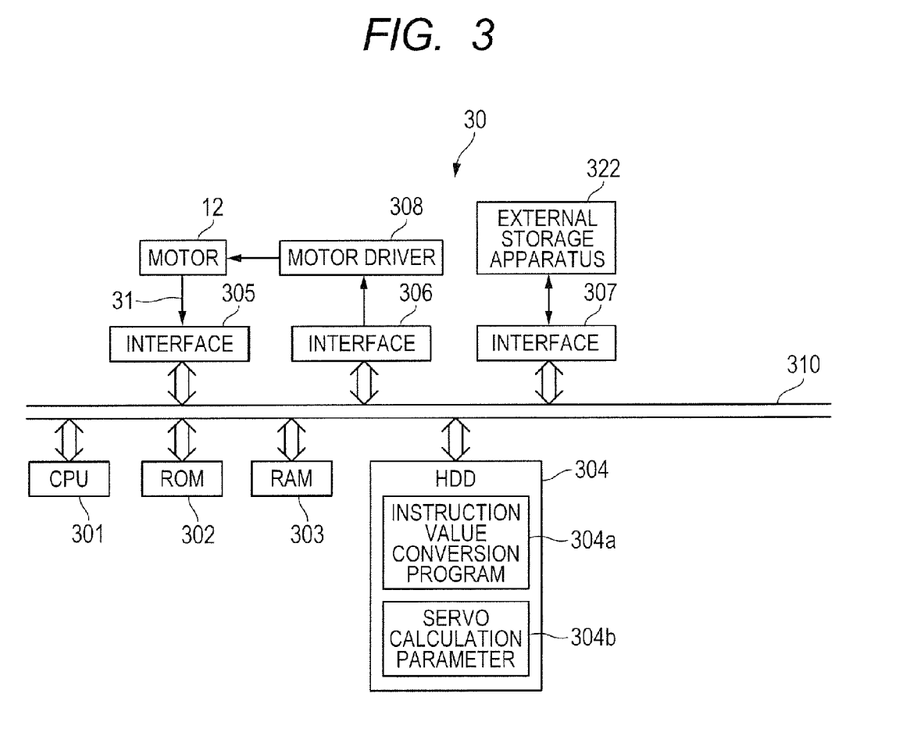
FIG. 3 is a block diagram illustrating a configuration of a hand controlling unit according to the embodiment of the present invention.

A configuration of the hand controlling unit 30 will be described with reference to FIG. 3. The hand controlling unit 30 includes: a CPU 301 capable of calculating a program; a ROM 302 and a RAM 303 functioning as storage units capable of storage; and an HDD (hard disk drive) 304 as a recording medium. The hand controlling unit 30 further includes various interfaces 305 to 307 and a motor driver 308.

The ROM 302, the RAM 303, the HDD 304 and the various interfaces 305 to 307 are connected to the CPU 301 through a bus 310. For example, data of various programs and filters for operating the CPU 301 is stored in the HDD 304 (or may be an external storage apparatus 322).

Among the various programs, an instruction value conversion program 304a is a program for the CPU 301 to convert controlling instructions transmitted from the controlling instruction unit 40 into parameters necessary for servo calculation. Specifically, controlling instructions, such as position, speed, grip force and grip level, transmitted from the controlling instruction unit 40 are converted into parameters, such as position, speed and current value. The controlling instruction based on the grip level is, for example, a controlling instruction for designating the grip force in ten stages of level 1 to 10 when the specification of the maximum grip force of the robot hand 10 is 50N. In this case, a controlling instruction of grip force 5N can be transmitted in a controlling instruction of grip level 1, and a controlling instruction of grip force 50N can be transmitted in a controlling instruction of grip level 10. Among the various data, a servo calculation parameter 304b is a parameter used as necessary when the CPU 301 executes servo calculation and includes, for example, a parameter of PID gain used for calculating the motor driving current.

The motor 12 included in the robot hand 10 is connected to the interface 305 through the hand cables 31, and the motor driver 308 is connected to the interface 306. The external storage apparatus (for example, an external HDD or a non-volatile memory) 322 is connected to the interface 307.

From the motor 12, an output signal regarding the number of rotations and the rotation angle of the motor 12 is transmitted from the encoder circuit 18. The CPU 301 uses the parameters converted by the instruction value conversion program 304a, the output signal received from the encoder circuit 18 and the motor driving current to execute servo calculation and outputs a motor driving signal to the motor driver 308. The motor driver 308 includes a half-bridge circuit of U phase, V phase and W phase that is a detection circuit of the motor driving current. The motor driving signal is a PWM (Pulse Width Modulation) signal for driving the half-bridge circuit included in the motor driver 308.

The motor driver 308 activates the built-in half-bridge circuit according to a driver driving signal and supplies a motor driving current to the motor 12 through the hand cables 31 to drive the motor 12. In this way, the robotics device 1 can cause the hand controlling unit 30 to calculate the controlling instruction transmitted from the controlling instruction unit 40 and drive the motor 12 through the motor driver 308 based on the calculation result to cause the fingers 11a and 11b to grip the work W with desired grip force.

A robot hand controlling method according to the present embodiment will be described. Roughly speaking, in the robot hand controlling method according to the present embodiment, the hand controlling unit 30 first executes setting first grip force in gripping the work W when the fingers 11a and 11b are not gripping the work W (open state). In the robot hand controlling method, the first grip force is used to calculate the motor driving current and the motor rotating speed of the motor 12, and the motor 12 is driven based on the calculated motor driving current and motor rotating speed. The hand controlling unit 30 then executes causing the fingers 11a and 11b to grip the work W.

In the robot hand controlling method, calculating a position is first executed when the grip force is to be changed while the fingers 11a and 11b are gripping the work W (closed state) with the first grip force. In the calculating the position, a correlation value indicating the relationship between the grip force of the fingers 11a and 11b and the position of the fixing portions 112a and 112b, the first grip force, and second grip force that is a target value of the grip force are used to calculate the position of the fixing portions 112a and 112b in gripping the work W with the second grip force. In the robot hand controlling method, the hand controlling unit 30 then executes changing grip force of driving the motor 12 by calculating a driving quantity of the motor 12 necessary to move the fixing portions 112a and 112b to the calculated position of the fixing portions 112a and 112b.

Figure 4:
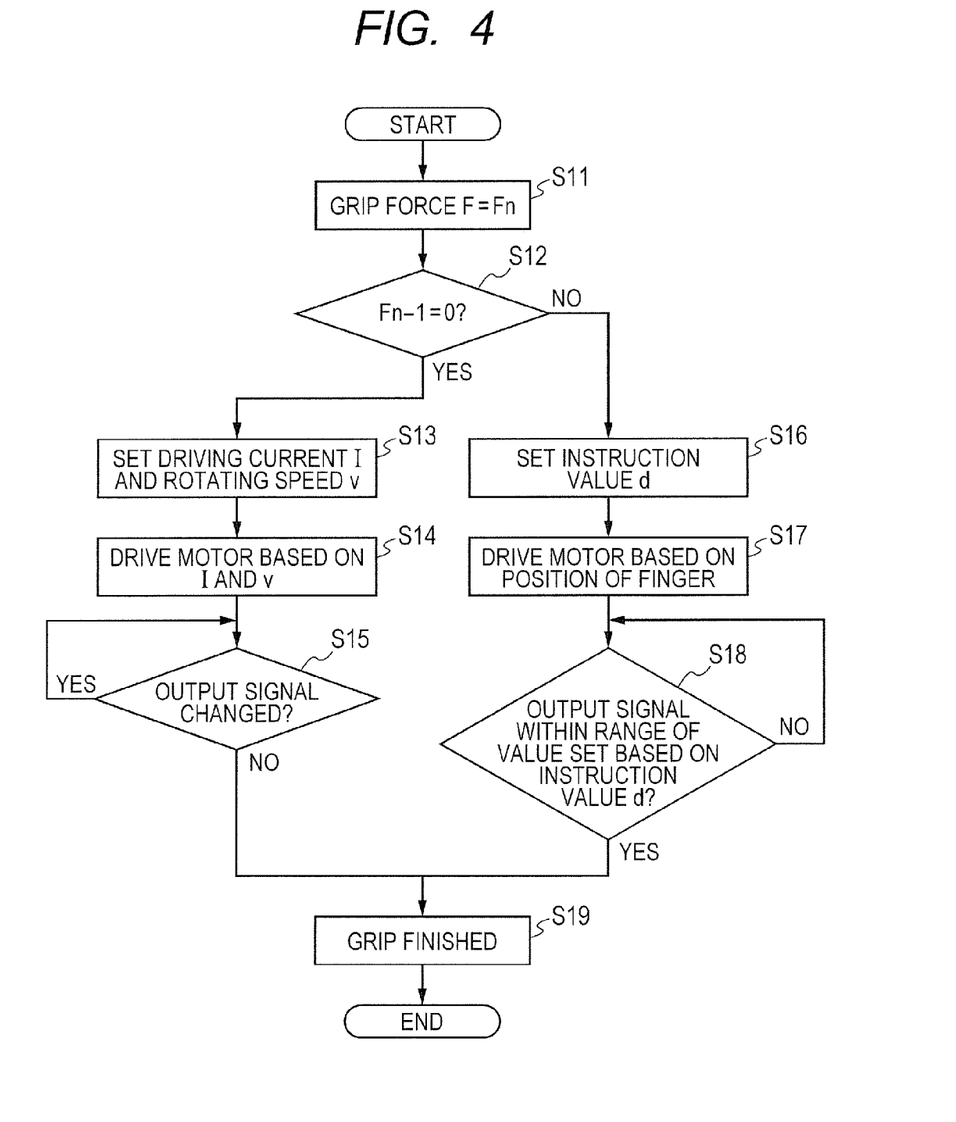
FIG. 4 is a flow chart illustrating a robot hand controlling program according to the embodiment of the present invention.

Details of a robot hand controlling program executed by the hand controlling unit 30 when the robot hand 10 of the present embodiment grips the work W will be described with reference to FIG. 4. FIG. 4 is a flow chart illustrating grip control executed by the hand controlling unit 30. The grip control is executed according to a robot hand controlling program set in advance by the user. The grip control is executed in the state before the work W is gripped and in the state that the work W is gripped, after the position of the robot hand 10 and the robot arm 20 is controlled such that the work W to be gripped is positioned between the fingers 11a and 11b of the robot hand 10.

The CPU 301 of the hand controlling unit 30 receives a controlling instruction from the controlling instruction unit 40, the controlling instruction indicating grip force $F_n$ that is target grip force when the fingers 11a and 11b grip the work W (S11). In this process, the CPU 301 receives the controlling instruction of the grip force $F_n$ from the controlling instruction unit 40 and stores, in the RAM 303, a controlling instruction of grip force $F_{n-1}$ received from the controlling instruction unit 40 the last time. When the fingers 11a and 11b are in the open state at the execution of the process of step S11, the CPU 301 stores grip force $F_{n-1}=0$ in the RAM 303. In the present embodiment, the process of step S11 by the hand controlling unit 30 comprises setting grip force.

The CPU 301 determines whether the grip force $F_{n-1}$ stored in the RAM 303 is 0 (S12). In this process, the CPU 301 determines whether the grip control of this time is a gripping process executed in the open state or a grip adjustment process executed when the fingers 11a and 11b are in the closed state.

If the CPU 301 determines that the grip force $F_{n-1}$ is 0 in the process of step S12 (Yes), the CPU 301 determines that the process is the gripping process executed in the open state and reads the instruction value conversion program 304a from the HDD 304. The CPU 301 sets a motor driving current I and a motor rotating speed v according to the instruction value conversion program 304a (S13). In this process, the CPU 301 uses an initial grip conversion table saved in advance in the ROM 302 and reads the motor driving current I [A] and the motor rotating speed v [rpm] corresponding to the target grip forced $F_n$ [N] according to the instruction value conversion program 304a. The CPU 301 stores, in the RAM 303, the read motor driving current I and motor rotating speed v as parameters obtained by converting the controlling instructions received from the controlling instruction unit 40 based on the instruction value conversion program 304a.

The initial grip here denotes gripping the work W by the fingers 11a and 11b from the open state. The initial grip conversion table is a data table created from data of a relationship between the motor driving current I [A], the motor rotating speed v [rpm] and the grip force [N] obtained in advance by an experiment. The method of setting the motor driving current I and the motor rotating speed v is not limited to the method of using the conversion table. For example, the CPU 301 may calculate an approximate formula for deriving the relationship between the motor driving current I, the motor rotating speed v and the grip force F based on experimental data obtained in advance and use the approximate formula to calculate the motor driving current I and the motor rotating speed v. The grip force $F_n$ in the initial grip that is received by the hand controlling unit 30 from the controlling instruction unit 40 and that is set as the grip force of the fingers 11a and 11b is the first grip force according to the present embodiment.

The CPU 301 uses the motor driving current I and the motor rotating speed v stored in the RAM 303 in step S13 to perform servo calculation and outputs a motor driving signal to the motor driver 308. The motor driver 308 supplies a motor driving current based on the motor driving signal to the motor 12 to drive the motor 12 (S14). In this process, the CPU 301 drives the motor 12 with the calculated motor driving current I and motor rotating speed v through the motor driver 308 and drives the motor 12 to put the fingers 11a and 11b in the open state into the closed state. In this way, the CPU 301 can cause the fingers 11a and 11b to grip the work W with the target grip force $F_n$.

The CPU 301 determines whether the received output signal of the number of rotations and the rotation angle of the motor 12 output from the encoder circuit 18 is changed from the output signal received the last time (S15). In this process, the CPU 301 determines the change in the output signal to determine whether the fingers 11a and 11b come into contact with the work W so that the movement of the fingers 11a and 11b is stopped, that is, the drive of the motor 12 is stopped, in balance with reaction force from the work W. In this process, if the CPU 301 determines that the received output signal is changed from the output signal received the last time (Yes), the CPU 301 repeats the process of step S15. In this process, if there is no change in the received output signal or if the difference between the received output signal and the output signal received the last time is lower than a specific threshold (No), the CPU 301 advances the process to step S19. The case in which the process of step S15 is No corresponds to a state in which gripping is finished, and details will be described later.

On the other hand, if the CPU 301 determines that the grip force $F_{n-1}$ is not 0 in the process of step S12 (No), the CPU 301 executes a grip force adjustment process described below that is a process executed in the closed state. In the grip force adjustment process, the grip force $F_n$ set as the grip force of the fingers 11a and 11b is set by the controlling instruction unit 40 transmitting corresponding data and the hand controlling unit 30 receiving the data, and the grip force $F_n$ is the second grip force according to the present embodiment. In the grip force adjustment process, the current grip force $F_{n-1}$ stored in the RAM 303 is the first grip force according to the present embodiment.

An example of the case in which the grip force adjustment process is executed includes fitting operation of fitting a soft cap-like component into a boss of a main work. In the fitting operation, the cap-like component may be deformed and may not be able to be fitted due to a mismatch with the shape of the boss. To prevent this, the component needs to be gripped with low grip force, and the position needs to be adjusted to the position of the boss while preventing the deformation. Therefore, at the execution of the fitting operation, the robotics device 1 adjusts the grip force to higher grip force after the opening of the cap-like component gripped with the low grip force is hooked to the tip of the boss. The robotics device 1 then pushes and fits the component into the root of the boss.

An example of the case in which the grip force adjustment process is executed includes insertion operation in which a rigid rod-shaped component is inserted to a similarly rigid main work. In the insertion operation, high positioning accuracy is required in fitting the rigid bodies. When the absolute position accuracy of the robotics device is lower than the required positioning accuracy, the rod-shaped component and the main work may interfere with each other, and a flaw may be generated. In the insertion operation, it is desirable to reduce the time of the movement of the rod-shaped component to the insertion hole of the main work. Therefore, at the execution of the insertion operation, the robotics device 1 first stabilizes and grips the rod-shaped component with high grip force and quickly adjusts the position to the insertion hole of the main work to put the rod-shaped component into the tip of the insertion hole. The robotics device 1 then adjusts the grip force to low grip force and inserts the rod-shaped component into the insertion hole while preventing excessive interference of the rod-shaped component with the insertion hole of the main work.

In the grip force adjustment process, the CPU 301 reads the instruction value conversion program 304a from the HDD 304. The CPU 301 sets a movement quantity $\Delta d$ of the fixing portions 112a and 112b of the fingers 11a and 11b according to the instruction value conversion program 304a. The CPU 301 uses a value of a current position $d_0$ of the fixing portions 112a and 112b corresponding to the current grip force $F_{n-1}$ and a value of the movement quantity $\Delta d$ of the fixing portions 112a and 112b to calculate an instruction value d of position control (S16). The process of step S16 by the hand controlling unit 30 comprises the calculating the position according to the present embodiment.

In this process, the CPU 301 first calculates $\Delta F$ that is a difference between the current grip force $F_{n-1}$ stored in the RAM 303 and the target grip force $F_n$ included in the controlling instruction received from the controlling instruction unit 40. The CPU 301 then assigns the value of $F_n$ [N] and the value of $F_{n-1}$ [N] to a formula $\Delta F = F_n - F_{n-1}$ to calculate $\Delta F$ [N]. The CPU 301 calculates the current position $d_0$ of the fixing portions 112a and 112b corresponding to the current grip force $F_{n-1}$ from the output signal received from the encoder circuit 18 according to the instruction value conversion program 304a. The CPU 301 uses the grip force adjustment conversion table saved in advance in the ROM 302 and sets the movement quantity $\Delta d$ [mm] of the fixing portions 112a and 112b corresponding to $\Delta F$ according to the instruction value conversion program 304a. The CPU 301 assigns the value of $d_0$ [mm] and the value of $\Delta d$ [mm] to a formula $d = d_0 + \Delta d$ to calculate the instruction value d of the position control of the motor 12.

Figure 5:
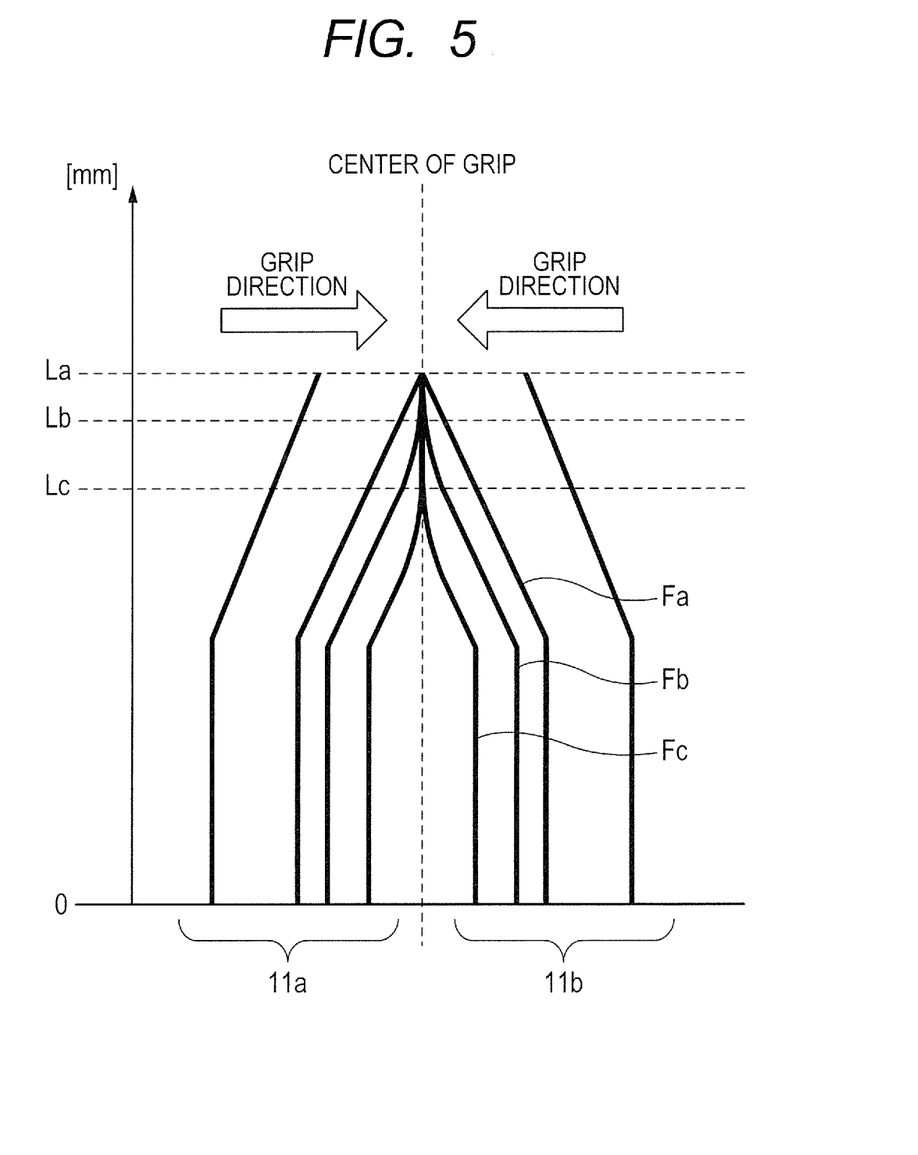
FIG. 5 is a schematic view illustrating grip force and contact points of fingers according to the embodiment of the present invention.

The fingers 11a and 11b are elastically deformed at the gripping of the work W, and the position of the contact portions 111a and 111b relative to the fixing portions 112a and 112b is changed based on the set grip force. FIG. 5 is a schematic view illustrating a state in which the fingers 11a and 11b are brought into contact with each other with different grip force Fa, Fb and Fc. The strength of the grip force Fa, Fb and Fc is Fa<Fb<Fc. As illustrated in FIG. 5, when the set grip force is Fa, the position of the contact portions 111a and 111b is a part where the distance from the fixing portions 112a and 112b is La. When the set grip force is Fb, the position of the contact portions 111a and 111b is a part where the distance from the fixing portions 112a and 112b is Lb. When the set grip force is Fc, the position of the contact portions 111a and 111b is a part where the distance from the fixing portions 112a and 112b is Lc. The distances La, Lb and Lc from the fixing portions 112a and 112b are Lc<Lb<La. In this way, the higher the set grip force, the closer the contact portions 111a and 111b to the fixing portions 112a and 112b.

Figure 6:
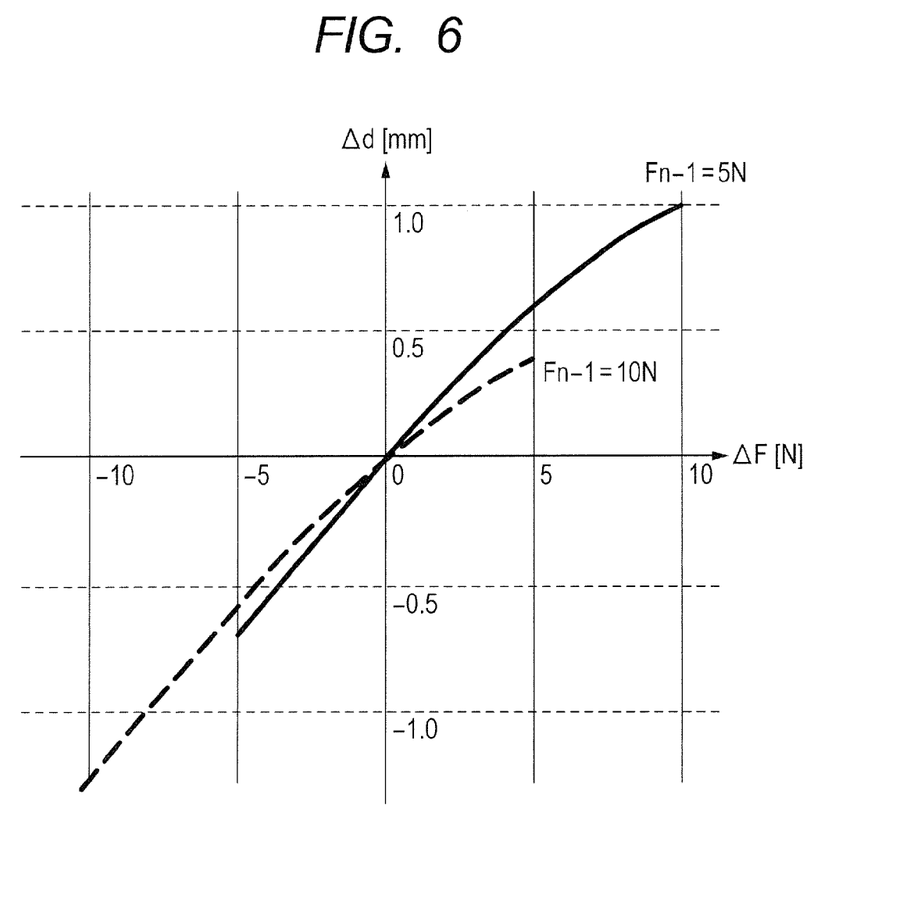
FIG. 6 is a graph illustrating a specific example of a relationship between the grip force and positions of the fingers according to the embodiment of the present invention.

FIG. 6 is a graph indicating a relationship between $\Delta F$ and $\Delta d$ measured in advance in an experiment in the robot hand 10 with the fingers 11a and 11b having the characteristics described above. FIG. 6 is a graph indicating a relationship between $\Delta F$ and $\Delta d$ in a case of $F_{n-1}=5$ [N] and a case of $F_{n-1}=10$ [N] in the grip force adjustment conversion table including the relationship between $\Delta F$ and $\Delta d$ measured in advance in an experiment. As for the movement quantity $\Delta d$ of the fixing portions 112a and 112b, the relationship between the difference $\Delta F$ from the target grip force $F_n$ and the movement quantity $\Delta d$ changes according to the current strength of the grip force $F_{n-1}$ as illustrated in FIG. 6, and the value of $\Delta d$ to $\Delta F$ is greater when the current grip force $F_{n-1}$ is weaker.

Figure 7:
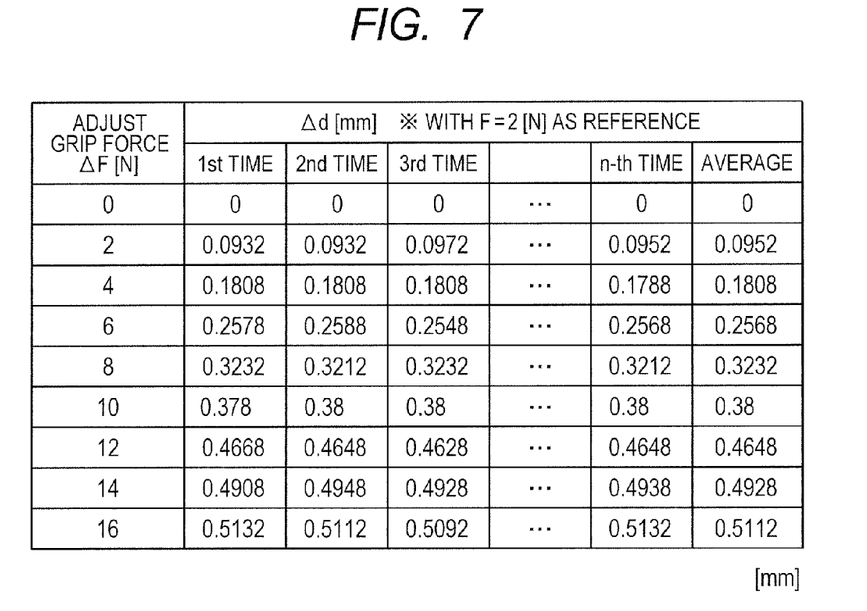
FIG. 7 is a diagram illustrating a specific example of a grip force adjustment table according to the embodiment of the present invention.

FIG. 7 is a specific example of a grip force adjustment table illustrating a relationship between $\Delta F$ and $\Delta d$ in a case in which the grip force is increased from a state that the fingers 11a and 11b are brought into contact with minimum grip force 2N when the grip force F that can be set in the robot hand 10 is 2 to 20 [N].

In creating the grip force adjustment table, the CPU 301 first performs grip operation for a plurality of times (n times), in which the fingers 11a and 11b are put into the closed state with the grip force in the entire range from 2 to 20N. The adjustment accuracy of the grip force increases with an increase in the number of times of the grip operation with each grip force and with an increase in the number of times of recording the measurement results. Although the grip force is changed by 2N in the measurement results illustrated in the grip force adjustment table of FIG. 7, the change quantity of the grip force in each grip operation may be set to a smaller quantity (for example, each 0.5N) to execute the grip operation. The grip force set at the execution of each grip operation is predetermined grip force in the present embodiment.

The CPU 301 records, as a measurement result, the output signal from the encoder circuit 18 at the time that the balancing of the reaction force is stopped as the fingers 11a and 11b are brought into contact. The CPU 301 subtracts the value of the measurement result with the grip force 2N from the values of the measurement results with each grip force. The CPU 301 calculates an average value of the measurement results with each grip force from the results of n times of measurement to thereby create the grip force adjustment table for adjusting the grip force from the state of gripping with the grip force F=2 [N] illustrated in FIG. 7. In this way, the grip force adjustment table that is a table in which the rigidity of the fingers 11a and 11b is taken into account and indicating the relationship between the grip force and the position of the fingers 11a and 11b comprises the correlation value in the present embodiment.

The grip force adjustment table illustrated in FIG. 7 is a grip force adjustment table referenced in changing the current grip force of 2N to the target grip force. To use a plurality of grip force set for the transition from the open state to the closed state, a plurality of grip force adjustment tables corresponding to each grip force set for the transition to the closed state can be stored in advance in the ROM 302.

In the process of step S16, the CPU 301 uses the grip force adjustment table corresponding to the current grip force $F_{n-1}$ among the grip force adjustment tables as illustrated in FIG. 7 to calculate the movement quantity $\Delta d$ [mm] of the fingers 11a and 11b corresponding to $\Delta F$. For example, when the current grip force $F_{n-1}$ is 2N, and the target grip force $F_n$ is 10N, the CPU 301 refers to the grip force adjustment table illustrated in FIG. 7 to set $\Delta d=0.3232$ [mm] as a value of $\Delta d$ when $\Delta F$ is 8N.

After the execution of the process of step S16, the CPU 301 uses the calculated instruction value d to execute the servo calculation to calculate the motor driving signal as the driving quantity of the motor 12. The CPU 301 outputs the calculated motor driving signal to the motor driver 308 and causes the motor driver 308 to drive the motor 12 (S17). In this process, the CPU 301 uses the calculated instruction value d to execute the servo calculation and outputs the motor driving signal to the motor driver 308 to drive the motor 12 to thereby move the fixing portions 112a and 112b to the position of d [mm]. The process of step S17 by the hand controlling unit 30 comprises the changing the grip force in the present embodiment. In this way, the CPU 301 is configured to bring the contact portions 111a and 111b of the fingers 11a and 11b into contact with the work W and substantially fix the contact portions 111a and 111b to the work W. The CPU 301 is configured to move the fixing portions 112a and 112b by the instruction value d to thereby control the position of the fingers 11a and 11b.

The CPU 301 determines whether the output signal from the encoder circuit 18 is within a range of values set based on the instruction value d (S18). In this process, the CPU 301 determines whether the movement of the fingers 11a and 11b is finished based on the output signal from the encoder circuit 18. The range of values set based on the instruction value d is determined by values calculated from the output signals that can be output from the encoder circuit 18. In this process, if the CPU 301 determines that the output signal is not within the range of values set based on the instruction value d (No), the CPU 301 repeats the process of step S18.

If the CPU 301 determines that there is no change in the received output signal in the process of step S15 (No) or if the CPU 301 determines that the output signal is within the range of values set based on the instruction value d in the process of step S18 (Yes), the CPU 301 moves to a process of step S19. In the process of step S19, the CPU 301 transmits a signal indicating that the gripping process or the grip adjustment process is finished to the controlling instruction unit 40 (S19). The controlling instruction unit 40 receives the signal indicating that the gripping process or the grip adjustment process is finished and proceeds to the following assembly operation.

As described, in the robot hand controlling method according to the present embodiment, the driving quantity of the motor 12 is controlled by using the instruction value d of the position control without using the motor driving current I and the motor rotating speed v at the execution of the grip force adjustment process. In the robot hand controlling method, the motor 12 can be driven to move the fixing portions 112a and 112b to control the position of the fingers 11a and 11b to thereby make an adjustment from the first grip force $F_{n-1}$ to the second grip force $F_n$. Therefore, the robotics device 1 can use the robot hand controlling method according to the present embodiment to change the grip force by calculating the driving quantity of the motor 12 from the position d of the fingers 11a and 11b when the work W is gripped by the changed grip force. As a result, the robotics device 1 using the robot hand controlling method according to the present embodiment can accurately adjust the grip force from the state that the work W is gripped.

In the robot hand controlling method according to the present embodiment, the robot hand 10 with a simple configuration without a sensor or the like that measures the grip force can execute the gripping process and the grip adjustment process. Therefore, the robot hand controlling method according to the present embodiment can be used to downsize the robot hand 10 in the robotics device 1 and manufacture the robotics device 1 at a low cost.

Although the grip force adjustment table is a table of the relationship between the grip force of the fingers 11*a* and 11*b* and the position of the fixing portions 112*a* and 112*b* in which the rigidity of the fingers 11*a* and 11*b* is taken into account in the present embodiment, the table is not limited to this, and a deformation amount of the work W can also be taken into account. In this case, the grip force adjustment table is created by measuring the position of the fixing portions 112*a* and 112*b* by causing the fingers 11*a* and 11*b* in the open state to grip the work W in the entire range of the grip force that can be set. Variations in the dimensional tolerance of the work W also need to be considered in creating the grip force adjustment table of the gripped work W. When there is a plurality of types of work W, the grip force adjustment table may be created according to the types of the work W. The grip force adjustment table in which the deformation amount of the work W is taken into account can be used to easily adjust the grip force in the robot hand controlling method even in gripping of the work W with a low rigidity that is deformed when the fingers 11*a* and 11*b* grip the work W.

Although the CPU 301 uses the grip force adjustment table to set $\Delta d$ at the execution of the grip adjustment process in the present embodiment, the process is not limited to this. The CPU 301 may assume the fingers 11*a* and 11*b* as a cantilever model to calculate $\Delta d$ from a calculation formula of deflection, for example. The CPU 301 may derive a calculation formula for adjusting the grip force that approximates the relationship between $\Delta F$ and $\Delta d$ based on data of a plurality of grip force adjustment tables or may store the calculation formula in advance in the ROM 302 to calculate $\Delta d$ by assigning $\Delta F$ to the calculation formula. Various steps of creating the grip force adjustment table and setting in advance the relationship between $\Delta F$ and $\Delta d$, such as the calculation formula for adjusting the grip force, comprise the setting the correlation value in the present embodiment, and various calculation formulas for adjusting the grip force comprise the correlation value in the present embodiment. The calculation of $d\Delta$ based on the calculation formula for adjusting and converting the grip force is the same even when the deformation amount of the work W is taken into account. The calculation formula in which the deformation amount of the work W is taken into account may be derived or stored in advance in the ROM 302 to calculate $\Delta d$.

Since the control model is different between the grip force adjustment process and the gripping process in the present embodiment, the CPU 301 may change the PID gain of control in the grip force adjustment process from the PID gain of control in the gripping process. An example of changing the PID gain of control in the grip force adjustment process includes setting a higher integral gain to control the position at the target position d against the elasticity of the fingers 11*a* and 11*b*.

Although the CPU 301 determines whether the fingers 11*a* and 11*b* are in the open state or the closed state based on whether the grip force $F_{n-1}$ is 0 in the process of step S12 in the present embodiment, the method is not limited to this. For example, in a method of determining the open state and the closed state by the CPU 301, a command of controlling instruction transmitted from the controlling instruction unit 40 may be stored in the RAM 303 every time the command is received, and the CPU 301 may refer to the content of the command to determine whether the fingers 11*a* and 11*b* are in the open state or the closed state.

Although the CPU 301 of the robotics device 1 receives the output signals output from the encoder circuit in the processes of steps S15 and S18 to determine whether the gripping process or the grip adjustment process is finished in the present embodiment, the process is not limited to this. For example, the controlling instruction unit 40 of the robotics device 1 may be configured to determine the end of the gripping process or the grip adjustment process. According to the configuration, the hand controlling unit 30 of the robotics device 1 needs to periodically transmit the output signals, which are output from the encoder circuit 18, to the controlling instruction unit 40 through the communication cable 41.

Although the hand controlling unit 30 executes the robot hand controlling program illustrated in FIG. 4 in the present embodiment, the robot hand controlling program can be recorded in a computer-readable recording medium, and a computer can read and execute the robot hand controlling program.

Although the CPU 301 of the hand controlling unit and the instruction value conversion program 304*a* convert the controlling instructions transmitted from the controlling instruction unit 40 into the parameters necessary for the servo calculation in the robotics device 1 in the present embodiment, the arrangement is not limited to this. For example, the controlling instruction unit 40 of the robotics device 1 may convert the controlling instructions into the parameters necessary for the servo calculation.

Figure 8:
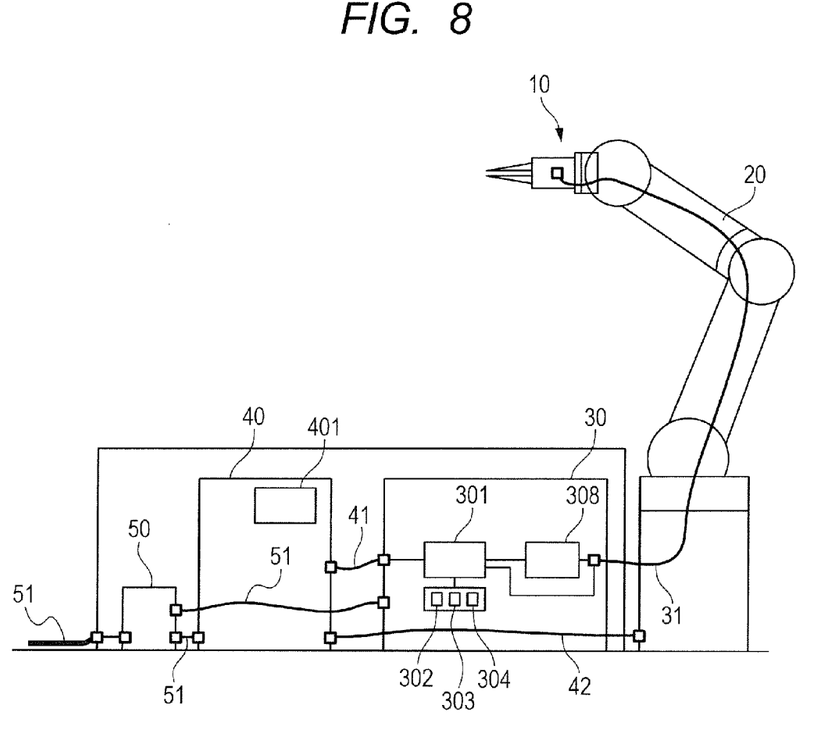
FIG. 8 is a schematic diagram illustrating a modified example of the robotics device according to the embodiment of the present invention.

FIG. 8 is a diagram illustrating the robotics device 1 in which the controlling instruction unit 40 converts the controlling instructions into the parameters necessary for the servo calculation. As illustrated in FIG. 8, the controlling instruction unit 40 includes a CPU 401 that executes various calculation processes for converting the controlling instructions into the parameters necessary for the servo calculation. The CPU 401 can execute the processes of steps S11 to S13 and S16 illustrated in FIG. 4. More specifically, the CPU 401 uses the initial grip conversion table to convert the controlling instructions at the execution of the gripping process and transmits the converted motor driving current I and motor rotating speed v to the CPU 301. The CPU 401 further prepares a test grip mode for putting the fingers 11*a* and 11*b* into the closed state with a plurality of different instruction grip force. The CPU 401 can store, in the RAM 403, the obtained relationship between the instruction grip force and the stop position of the fixing portions 112*a* and 112*b* in gripping with the grip force to thereby acquire the grip force adjustment table to execute the grip adjustment process.

According to the configuration, the robotics device 1 can combine a commercially available robot hand and a hand controller with the controlling instruction unit to realize the robot hand controlling method of the present invention. The robotics device 1 can also acquire again and update the relationship between $\Delta F$ and $\Delta d$ when the relationship between $\Delta F$ and $\Delta d$ in the initially acquired grip force adjustment table or in the calculation formula that can calculate $\Delta d$ from $\Delta F$ is broken due to a temporal change of the robot hand 10. Therefore, the robotics device 1 can calibrate the relationship between ΔF and Δd. The robotics device 1 can also acquire the grip force adjustment table or the calculation formula that can calculate Δd from ΔF while continuing the assembly operation when the type of the work W is changed.

Although the fingers 11a and 11b are a pair of members in a tweezer shape in the present embodiment and the modified example, the arrangement is not limited to this. Any shape and the number of fingers are possible as long as the fingers are elastic and capable of grasping the work W.

Although the motor 12 is an AC servo motor including the encoder circuit 18 that is a sensor for detecting the rotation angle in the present embodiment and the modified example, the arrangement is not limited to this, and any actuator including a sensor capable of controlling the grip force and controlling the position can be used. Although the robot hand 10 includes one motor 12 as an actuator for generating the driving force, the arrangement is not limited to this, and a plurality of actuators may be included for respective fingers. Although the robot hand 10 includes the rack gears 14a and 14b and the pinion gear 15 that are driving force transmission mechanisms in the present embodiment and the modified example, the arrangement is not limited to this. The robot hand 10 can be any component that can drive the motor 12 to move the fingers 11a and 11b to grip the work W.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-019482, filed Feb. 3, 2015, which is hereby incorporated by reference herein in its entirety.

What is claimed is:

1. A controlling method of a robot hand, the robot hand comprising:
    a plurality of fingers configured to grasp a work; and
    an actuator configured to move at least one of the plurality of fingers, wherein
    a controlling unit executes the method to perform:
    acquiring a first position of the plurality of fingers for grasping the work with a first grip force by the plurality of fingers by using position of the plurality of fingers in relation to the first grip force preliminarily acquired;
    moving the plurality of fingers to the first position by the actuator for grasping the work;
    acquiring a second position of the plurality of fingers for grasping the work with a second grip force by the plurality of fingers by using a movement quantity of the plurality of fingers in relation to a difference between the first grip force and a second grip force preliminarily acquired; and
    moving the plurality of fingers from the first position to the second position by the actuator.

2. The robot hand controlling method according to claim 1, wherein
    the position of the plurality of fingers in relation to the first grip force, or the movement quantity of the plurality of fingers in relation to a difference between the first grip force and the second grip force preliminarily acquired is a correlation, and
    the correlation value indicates the relationship between the grip force of the plurality of fingers and the position of the plurality of fingers in which a deformation amount of the work is taken into account.

3. The robot hand controlling method according to claim 2, wherein the controlling unit further executes setting the correlation value by measuring in advance the position of the plurality of fingers when the plurality of fingers grip the work with predetermined grip force.

4. The robot hand controlling method according to claim 1, wherein the controlling unit further executes setting the correlation value by measuring in advance the position of the plurality of fingers when the plurality of fingers are brought into contact with predetermined grip force.

5. The robot hand controlling method according to claim 1, wherein the controlling unit further executes:
    setting the first grip force; and
    causing the plurality of fingers to grip the work by using the first grip force set in the setting the first grip force to calculate a driving current and a rotating speed of the actuator to drive the actuator with the calculated driving current and rotating speed.

6. A robotics device comprising:
    a robot hand comprising:
        a plurality of fingers configured to grasp a work; and
        an actuator configured to move at least one of the plurality of fingers; and
    a controlling unit configured to control to:
    acquire a first position of the plurality of fingers for grasping the work with a first grip force by the plurality of fingers by using position of the plurality of fingers in relation to the first grip force preliminarily acquired;
    move the plurality of fingers to the first position by the actuator for grasping the work;
    acquire a second position of the plurality of fingers for grasping the work with a second grip force by the plurality of fingers by using a movement quantity of the plurality of fingers in relation to a difference between the first grip force and the second grip force preliminarily acquired; and move the plurality of fingers from the first position to the second position by the actuator.

7. The robotics device according to claim 6, wherein the position of the plurality of fingers in relation to the first grip force, or the movement quantity of the plurality of fingers in relation to a difference between the first force and the second force preliminary acquired is a correlation, and the controlling unit uses the correlation value indicating the relationship between the grip force of the plurality of fingers and the position of the plurality of fingers in which a deformation amount of the work is further taken into account.

8. The robotics device according to claim 7, wherein the controlling unit sets the correlation value by measuring in advance the position of the plurality of fingers when the plurality of fingers grips the work with predetermined grip force.

9. The robotics device according to claim 6, wherein the controlling unit sets the correlation value by measuring in advance the position of the plurality of fingers when the plurality of fingers are brought into contact with predetermined grip force.

10. The robotics device according to claim 6, wherein the controlling unit sets the first grip force and causes the plurality of fingers to grip the work by using the set first grip force to calculate a driving current and a rotating speed of the actuator to drive the actuator with the calculated driving current and rotating speed.

11. The robotics device according to claim 6, further comprising a robot arm including a plurality of joints and provided with the robot hand at a tip.

12. A robot hand controlling program recorded on a non-transitory computer medium, for operating a computer to execute a controlling method of a robot hand, the robot hand comprising:

a plurality of fingers configured to grasp a work; and an actuator configured to move at least one of the plurality of fingers, wherein a controlling unit executes the method to perform:

acquiring a first position of the plurality of fingers for grasping the work with a first grip force by the plurality of fingers by using position of the plurality of fingers in relation to the first grip force preliminarily acquired;

moving the plurality of fingers to the first position by the actuator for grasping the work;

acquiring a second position of the plurality of fingers for grasping the work with a second grip force by the plurality of fingers by using a movement quantity of the plurality of fingers in relation to a difference between the first grip force and the second grip force preliminarily acquired; and moving the plurality of fingers from the first position to the second position by the actuator.

13. A non-transitory computer-readable recording medium storing a robot hand controlling program for operating a computer to execute a controlling method of a robot hand, the robot hand comprising:

a plurality of fingers configured to grasp a work; and an actuator configured to move at least one of the plurality of fingers, wherein a controlling unit executes the program to perform:

acquiring a first position of the plurality of fingers for grasping the work with a first grip force by the plurality of fingers by using position of the plurality of fingers in relation to the first grip force preliminarily acquired;

moving the plurality of fingers to the first position by the actuator for grasping the work;

acquiring a second position of the plurality of fingers for grasping the work with a second grip force by the plurality of fingers by using a movement quantity of the plurality of fingers in relation to a difference between the first grip force and the second grip force preliminarily acquired; and moving the plurality of fingers from the first position to the second position by the actuator.

* * * * *